Dec. 13, 1960 J. G. FAY ET AL 2,964,695

IMPEDANCE CONTROLLED MAGNETIC AMPLIFIER

Filed June 20, 1957

WITNESSES:

Bernard R. Gieguez

Myron E. Click

INVENTORS
Joseph G. Fay and
John F. Ringelman.

BY F. E. Browder
ATTORNEY

United States Patent Office 2,964,695

Patented Dec. 13, 1960

2,964,695

IMPEDANCE CONTROLLED MAGNETIC AMPLIFIER

Joseph G. Fay, Baltimore, and John F. Ringelman, Catonsville, Md., assignors to Westinghouse Electric Corporation, East Pittsburgh, Pa., a corporation of Pennsylvania Filed June 20, 1957, Ser. No. 666,953

7 Claims. (Cl. 323—89)

This invention relates to self-saturating magnetic amplifiers in general and, in particular, it relates to the biasing of such magnetic amplifiers.

In a copending application, Serial No. 587,538, filed May 28, 1956, now abandoned, and assigned to the assignee of the present application, there is described a novel type of self-saturating magnetic amplifier which is controlled by means of a variable impedance, saturable reactor included in its control circuit. In the amplifier described in the aforesaid application, the time during which a reset voltage is applied to the saturable magnetic core of the self-saturating magnetic amplifier is a function of the time in which the reactor in the control circuit of the amplifier saturates, and this in turn is a function of the control voltage applied to the reactor.

The circuit described in the aforesaid application will operate satisfactorily for its intended function, however, certain inherent magnetic amplifier characteristics such as drift and gain change of the magnetic amplifier due to changes in environmental conditions are undesirable.

It is an object of this invention to provide a new and improved impedance controlled magnetic amplifier.

It is a further object of this invention to provide an improved impedance controlled, self-saturating magnetic amplifier in which a substantially constant quiescent operating point is maintained.

Further objects of this invention will become apparent from the following description, when taken in conjunction with the accompanying drawings. In said drawings, for illustrative purposes only, are shown preferred forms of the invention.

In all of the drawings, the manner in which the primary and secondary windings of the transformers are wound on their associated cores is indicated by dots which represent points of like instantaneous polarity. Thus, if the dots are on the same end of the transformer core, the windings are wound around the core in the same direction; whereas, if the dots are on opposite ends of the core, the windings are wound in opposite directions.

As will become apparent from the following description, the basic magnetic amplifier of the present invention makes use of a high remanence, saturable core member having wound thereon a control winding and a load winding. An alternating voltage source is coupled to these windings by means of rectifiers which are poled so that on first alternate half-cycles of the alternating voltage, voltages applied to the load winding drive the magnetization level of the reactor toward saturation, and on second alternate half-cycles of the alternating voltage, a voltage is applied to the control winding to "reset" or withdraw the magnetization level of the reactor from saturation. The secondary winding of the saturable reactor is connected in series with the alternating voltage source and the control winding. By applying a direct-current input voltage to the primary winding of the saturable reactor, the magnetization level set by the control winding on reset half-cycles of operation may be controlled. After the saturable core has become saturated during the half-cycle of voltage application to the load winding, the impedance presented thereby will drop from a very high value to a very low value and the voltage across the load impedance connected in series with the load winding will arise to substantially the same voltage as that of the alternating voltage source. The time interval of voltage developed across the load impedance, therefore, will be determined by the magnetization level set in the core during the half-cycle of voltage application to the control winding. Inasmuch as this magnetization level is a function of the input voltage applied to the saturable reactor in series with the control winding, the time interval of voltage developed across the load impedance will be functionally related to the input voltage applied to the reactor.

Figure 1:
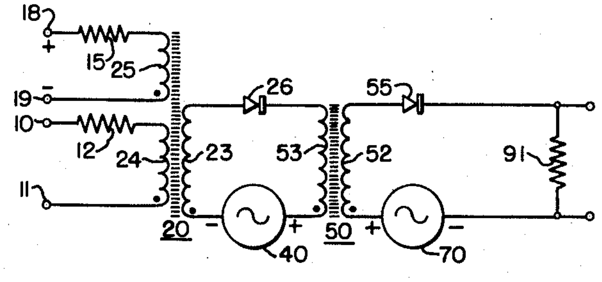
Figure 1 is a schematic diagram of a basic half-wave, self-saturating magnetic amplifier.

Referring to Fig. 1, there is shown a basic half-wave, self-saturating magnetic amplifier employing a saturable core reactor 50 having primary and secondary windings 53 and 52, respectively. Between the opposite terminals of secondary winding 52 are connected, in series, a source of alternating voltage 70, a rectifier 55, and a load impedance 91. In a similar manner, alternating voltage source 40, secondary winding 23 of a second saturable reactor 20 and a rectifier 26 are connected in series between the opposite terminals of primary winding 53. A source of control voltage, not shown, is applied to the input terminals 10 and 11 and thus to primary winding 24 of reactor 20 via resistor 12. A source of fixed bias voltage, not shown, is applied to a pair of terminals 18 and 19 and thus to a fixed bias winding 25 of reactor 20 via resistor 15. Output signals from the circuit are taken from across the load impedance 91.

In order to have a fuller understanding of the operation of the amplifier, an examination of the induced voltage equation for the reactors 50 and 20 should be made. This equation is:

$$B=N\frac{K}{A}\int e dt$$

where $B$=flux density of the core in webers per square unit of area;
$K$=constant determined by the core material;
$N$=number of turns of wire in the winding of the inductor;
$A$=cross-sectional area of the core of the inductor;
$e$=instantaneous voltage; and
$t$=time in seconds.

When the reactor has a core formed from rectangular hysteresis loop material, as in the present case, it will saturate and present a very low impedance when the flux density B reaches a predetermined value. It can be readily seen that the saturation level of flux density is a function of both the applied voltage and also the time interval during which that voltage is applied to the reactor. Voltage sources 70 and 40 are in phase, but have their output terminals reversed as shown by the polarity markings in Fig. 1. Consequently, since the rectifiers 55 and 26 are poled to conduct in the same direction, the rectifier 55 will conduct during one half-cycle of the applied voltage sources, while the rectifier 26 will conduct on the other half-cycle. When the polarity of the voltage sources is as shown in Fig. 1, the rectifier 55 will conduct and, initially, almost all of the voltage will appear across the winding 52 of the reactor 50 which is as yet unsaturated. After a given time interval, the reactor 50 will saturate; and, consequently, the voltage from the source 70 will appear across the impedance 91 to produce an output voltage.

During the next half-cycle, the rectifier 26 will conduct and will apply voltage across the primary winding 53 to drive the reactor 50 from saturation to a condition of unsaturation. That is, it will "reset" the reactor 50 to a particular unsaturated magnetization level. In accordance with the induced voltage equation given above, the magnetization level reached during the reset half-cycle will depend upon the time interval during which the voltage source 40 is applied across the winding 53. This time interval may be controlled by means of reactor 20 which functions in much the same way as reactor 50. In the latter case, however, the reset magnetization level of the reactor 20 is controlled by the control voltage applied to the terminals 10 and 11. By increasing the control voltage, the reactor 20 can be driven further from saturation during the half-cycle of operation when rectifier 55 conducts and, consequently, will saturate at a later period during the half-cycle when the rectifier 26 conducts, and, consequently, the reactor 50 will saturate sooner during the half-cycle when the rectifier 55 conducts to produce a greater average output voltage across the impedance 91. It can thus be seen that the average value of the output voltage appearing across the impedance 91 is directly proportional to the magnitude of the input voltage applied to the terminals 10 and 11, the greater the input voltage, the greater the average output voltage.

A fixed bias voltage may be applied to the terminals 18 and 19 to set the reactor 20 at a predetermined desired magnetization level which will determine a given operating point for the magnetic amplifier illustrated in Fig. 1.

Figure 2:
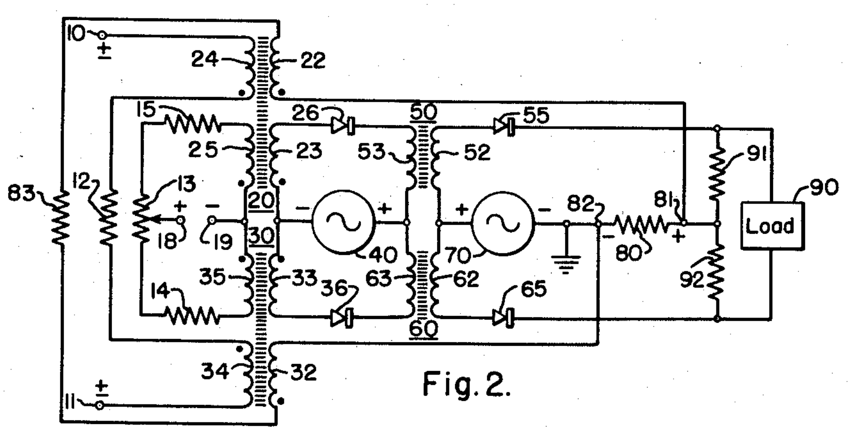
Fig. 2 is a schematic diagram of a two-stage half-wave magnetic amplifier embodying the teachings of this invention.

Referring to Fig. 2, there is illustrated a half-wave, push-pull magnetic amplifier embodying the teachings of this invention, in which like components of Figs. 1 and 2 have been given the same reference characters. The main distinction between the apparatus illustrated in Figs. 1 and 2 is that in Fig. 2 another basic half-wave, self-saturating magnetic amplifier similar to that illustrated in Fig. 1 has been added to furnish a reversible direct-current output to a load 90.

The additional half-wave, self-saturating magnetic amplifier employs a saturable core reactor 60 having primary and secondary windings 63 and 62, respectively. Between the opposite terminals of the secondary winding 62 are connected, in series, the source of alternating voltage 70, a resistor 80, a load resistor 92 and a rectifier 65. In a similar manner, the alternating voltage source 40, a secondary winding 33 of a second saturable reactor 30 and a rectifier 36 are connected in series between the opposite terminals of the primary winding 63 of the reactor 60. The primary windings 53, 63 and the secondary windings 52, 62 of the saturable reactors 50 and 60 have common terminals as illustrated.

A source of control voltage, not shown, is applied to the input terminals 10 and 11. The series control circuit has been expanded to not only include the primary winding 24 of the reactor 20 and the resistor 12, but also the primary winding 34 of the reactor 30. The fixed bias circuit has been expanded to two parallel branches connected to the terminals 18 and 19. In one parallel branch is a portion of an adjustable resistor 13, the resistor 15 and the fixed biased winding 25 of the reactor 20. In the other parallel branch is the remaining portion of the adjustable resistor 13, a resistor 14 and a fixed biased winding 35 of the reactor 30. If so desired, the bias windings may be properly connected in series circuit relationship. A negative feedback self-bias circuit is connected to the terminals 81 and 82 of the resistor 80 and includes a self-bias winding 22 of the reactor 20, a resistor 83 and a self-bias winding 32 of the reactor 30, in a series circuit.

In general, the two combined half-wave, self-saturating magnetic amplifiers operate in the same manner as the apparatus illustrated in Fig. 1. The main distinction is that the output voltage is delivered to the load 90 by the mixing resistor network comprising the resistor 91, the resistor 92 and the load 90. A reversal of polarity of the input control voltage as applied to the terminals 10 and 11 will reverse the polarity of the output of the magnetic amplifier to the load 90. The operation of the fixed bias circuit is the same as hereinbefore described with the exception that it now includes a fixed bias applied to the reactor 30 as well as the reactor 20. It is to be noted that the magnetic amplifiers herein described may be operated without the benefit of the fixed bias circuit on the reactors 20 and 30.

As is known to those skilled in the art, there are certain environmental conditions that tend to make magnetic amplifiers drift from a specified operating point. These "drift-rate components" include "temperature-drift," "frequency-drift," "voltage-drift," and so forth.

In the apparatus illustrated in Fig. 2, the self-bias voltage developed across the resistor 80 tends to be independent of the input signal applied to the terminals 10 and 11. This is true because when a signal is applied to the terminals 10 and 11, the change in current through the resistor 91 is matched by an equal but opposite change in the current through the resistor 92. Thus the current through and the voltage across the resistor 80 tends to remain constant with respect to the input signal applied to the terminals 10 and 11.

When external conditions such as temperature or supply voltage variations tend to cause the currents through the resistors 91 and 92 to change in the same direction, there is then a change in the sum of these two currents which will cause a change in the voltage across the resistor 80. The voltage taken from the resistor 80 is a measure of the quiescent current, that is, the load current with no-input-current condition. When the voltage across the resistor 80 changes, the self-bias current applied to the self-bias windings 22 and 32 also changes. This self-bias current then acts on the reactors 20 and 30 and thus the reactors 50 and 60 according to the voltage equation discussed above to change the currents through the resistors 91 and 92 back to their original levels. The overall effect is thus to maintain a constant quiescent operating point of the reactors which, in turn, reduces the drift and gain change of the amplifier due to changes in environmental conditions.

Figure 3:
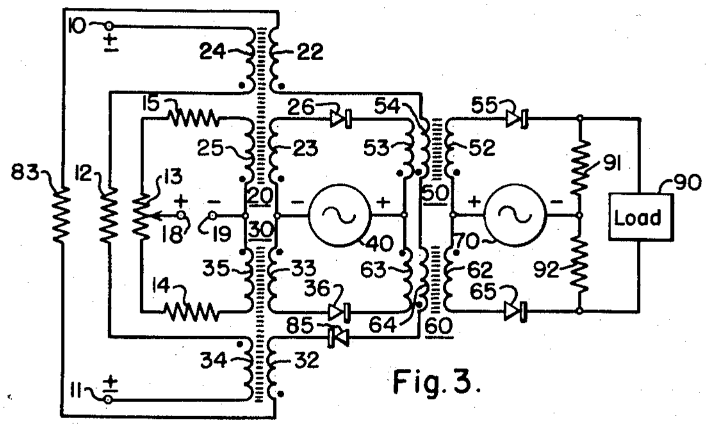
Fig. 3 is a schematic diagram of a second embodiment of this invention.

Referring to Fig. 3, there is illustrated another embodiment of the teachings of this invention in which like components of Figs. 2 and 3 have been given the same reference characters. The main distinction between the apparatus illustrated in Figs. 2 and 3 is that in Fig. 3 instead of measuring the quiescent current from the resistor 80 in the load circuit and applying a change in voltage to the self-bias windings there are included additional windings 54 and 64 on the reactors 50 and 60 respectively that measure the quiescent average flux level of the reactors 50 and 60. Thus, when the average flux levels of the reactors 50 and 60 tend to change, the induced voltage in the windings 54 and 64 is fed back as a negative self-bias to the reactors 20 and 30. This voltage is proportional to the sum of the volt-second integrals developed across the reactors 50 and 60 during their conduction half-cycle. Thus, when the quiescent average flux levels of the reactors 50 and 60 tend to change in a manner similar to the current change in the resistors 91 and 92 of Fig. 2, the self-bias to the reactors 20 and 30, respectively, operates in the manner hereinbefore described in the operation of Fig. 2 to prevent that change.

A rectifier 85 may be inserted in the self-bias circuit to insure unilateral conduction of current through the self-bias, negative feedback windings.

In conclusion, it is pointed out that while the illustrated examples constitute practical embodiments of our invention, we do not limit ourselves to the exact details shown, since modification of the same may be varied without departing from the spirit of this invention.

We claim as our invention:

1. In a magnetic amplifier, in combination, a pair of saturable magnetic cores which are driven to saturation by an output circuit including a load during the same one half-cycle of an applied alternating current voltage and then reset on the following half-cycle, circuit means for resetting said cores comprising a first winding inductively associated with one of said cores, a second winding inductively associated with the other of said cores, a common terminal connecting said first and second windings in series, a pair of unidirectional current devices and a pair of saturable inductive devices connected in series between the uncommon terminals of said first and second windings and means for applying an alternating current voltage to said reset circuit means, said pair of unidirectional current devices being poled in predetermined directions whereby said first and second windings are energized by said last-named alternating current voltage during the same half cycle thereof, a self-bias circuit comprising means responsive to load current flow for measuring a change in the quiescent operating point of said magnetic amplifier and means for feeding back the voltage developed across said measuring means to winding means inductively associated with said pair of saturable inductive devices, and other winding means for said paid of saturable inductive devices, said other winding means having the signal to be amplified applied thereto.

2. In a magnetic amplifier, in combination, first and second saturable magnetic core members, circuit means including a first source of alternating current voltage for driving said first and second core members toward saturation, said circuit means comprising first and second parallel current paths connecting opposite terminals of said alternating current source, said first path including a first load winding inductively coupled to said first core member and an impedance element which are separated by a unidirectional current device, said second path including a second load winding inductively coupled to said second core member and an additional impedance element which are separated by an additional unidirectional current device, the alternating current source being connected between the junction of said windings and the junction of said impedance elements, said unidirectional current device and additional unidirectional current device being poled in predetermined directions whereby current from the first altenating current source flows through both the first and second parallel current paths during the same alternation of said first source, both said first and second paths including an additional impedance element having the currents in both said first and second paths flowing therethrough and having a voltage developed thereacross proportional to the sum of the currents, other circuit means including a second source of alternating current for resetting said first and second saturable magnetic core members, said other circuit means comprising a pair of additional parallel unidirectional current paths connected between the opposite terminals of the second alternating current source, current flowing in both paths of said pair of additional parallel unidirectional current paths during the same alternation of the second alternating current source, said pair of additional paths including windings respectively inductively coupled to said first and second saturable core members, first saturable reactor means included in one of said additional paths, second saturable reactor means included in the other of said additional paths, first winding means for said first and second saturable reactor means having the signal to be amplified applied thereto, second winding means inductively coupled to said first and second saturable reactor means, and further circuit means connecting said second winding means to said additional impedance element whereby the voltage developed across the additional impedance element is applied to the second winding means, the voltage across the additional impedance element varying with variations in the quiescent current of the amplifier, said last-named voltage while applied to said second winding means automatically adjusting the biasing magnetic fields on the first and second saturable reactor means to maintain the operating point and the gain of the amplifier substantially constant.

3. A magnetic amplifier according to claim 2 including in addition resistor means having a preselected resistance value included in the further circuit means connecting the additional impedance element to the second winding means for regulating the supplemental biasing magnetic fields applied to the first and second saturable reactor means.

4. A magnetic amplifier comprising, in combination, first and second saturable magnetic core members, circuit means including a first source of alternating current and resistor means for driving said first and second core members toward saturation during the same alternation of the first alternating current, third and fourth saturable magnetic core members, other circuit means including a second source of alternating current in synchronism with the first source for resetting each of the first and second saturable magnetic core members during the other alternation of the first alternating current source, said other circuit means comprising a pair of parallel unidirectional current paths connected between the opposite terminals of the second alternating current source, one of said paths including windings inductively coupled to the first and third saturable magnetic core members and the other of said paths including windings inductively coupled to the second and fourth saturable magnetic core members, a pair of signal windings inductively coupled to the third and fourth saturable magnetic core members and having the signal to be amplified applied thereto, a pair of bias windings inductively coupled to the third and fourth saturable magnetic core members, and additional circuit means connecting the pair of bias windings to the resistor means, said resistor means having a unipolarity current therein which varies in amplitude in accordance with variations in the quiescent flux levels of the first and second saturable magnetic core members, said unipolarity current being applied to the pair of bias windings of the third and fourth saturable magnetic core members for automatically adjusting the biases and operating points of the third and fourth saturable magnetic core members in accordance with changes in said quiescent flux levels and in amounts and directions which tend to maintain the operating points constant.

5. A magnetic amplifier comprising, in combination, first and second saturable magnetic core members, first and second load windings inductively coupled to said first and second saturable magnetic core members respectively, first and second control windings inductively coupled to said first and second saturable magnetic core members respectively, a first source of alternating current potential, first circuit means including said first source of alternating current potential, a first unidirectional current device, a first impedance and a control resistor connected in series across said first load winding, second circuit means including said first source of alternating current potential, a second unidirectional current device, a second impedance and said control resistor connected in series across said second load winding, said first and second unidirectional current devices being poled in predetermined directions whereby current from the first source of alternating current potential flows through both the first and second unidirectional current devices during the same alternation of the first source, third and fourth saturable magnetic core members, said third and fourth saturable magnetic core members having third and fourth load windings inductively coupled thereto respectively, a second source of alternating current potential of the same frequency and in synchronism with the first source of alternating current potential, additional circuit means including the second source of alternating current potential, the third load winding, the first control winding and an additional unidirectional current device connected in series, further circuit means interconnecting in series said second source of alternating current potential, a further unidirectional current device, said fourth load winding and said second control winding, said additional unidirectional current device and said further unidirectional current device being poled in predetermined directions whereby current from the second source of alternating current potential flows through the additional circuit means and the further circuit means during the same alternation of the second source of alternating current potential, a pair of signal windings for the third and fourth saturable magnetic core members respectively and having the signal to be amplified applied thereto, a pair of bias windings for the third and fourth saturable magnetic core members respectively, and still further circuit means connecting the pair of bias windings to the control resistor, said control resistor having a unipolarity bias control potential developed thereacross which varies in amplitude in accordance with variations in the quiescent flux levels of the first and second saturable magnetic core members, said unipolarity bias control potential being applied to the pair of bias windings for automatically adjusting the biases and operating points of the third and fourth saturable magnetic core members in accordance with changes in the quiescent flux levels and in amounts and directions which tend to maintain the operating points constant.

6. A magnetic amplifier comprising, in combination, first and second saturable magnetic core members, first and second load windings inductively coupled to the first and second saturable magnetic core members respectively, first and second control windings inductively coupled to the first and second saturable magnetic core members respectively, a first source of alternating current potential, first circuit means including a first unidirectional current device, a first load impedance, a control resistor and said first source of alternating current potential connected across the first load winding, second circuit means including the first source of alternating current potential, a second unidirectional current device, a second load impedance, and said control resistor connected across said second load winding, said first unidirectional current device and said second unidirectional current device being poled in predetermined directions whereby current from the first source of alternating current potential flows through the first circuit means and the second circuit means during the same alternation of said first source, said control resistor having a unipolarity bias control potential developed thereacross which varies in amplitude in accordance with variations in the quiescent current in the first and second load windings, third and fourth saturable magnetic core members, third and fourth load windings for the third and fourth saturable magnetic core members respectively, an additional source of alternating current potential of the same frequency and in phase synchronism with the first source, further circuit means including a further unidirectional current device connecting the second source of alternating current potential, the third load winding and the first control winding in series, additional circuit means including the second source of alternating current potential and an additional unidirectional current device connecting the fourth load winding and the second control winding in series, said further unidirectional current device and said additional unidirectional current device being poled in predetermined directions whereby current from the second source of alternating current potential flows through the further circuit means and the additional circuit means during the same alternation of the second source of alternating current potential, a pair of signal windings inductively coupled to the third and fourth saturable magnetic core members respectively, said pair of signal windings having the signal to be amplified applied thereto, and a pair of bias windings inductively coupled to the third and fourth saturable magnetic core members, said pair of bias windings being operatively connected to the control resistor and having the unipolarity bias control potential applied thereto, said potential causing current flow in the pair of bias windings which automatically adjusts the biases and operating points of the third and fourth saturable magnetic core members in accordance with changes in the quiescent current level and in amounts and directions which tend to maintain the operating points constant.

7. In a magnetic amplifier, in combination, first and second saturable transformer means having first and second saturable magnetic core members respectively, circuit means operatively connected to the first and second saturable transformer means and including a first source of alternating current voltage for driving said first and second core members toward saturation, said circuit means comprising first and second parallel current paths connecting opposite terminals of said alternating current source, said first path including a first load winding of said first transformer means inductively coupled to said first core member and a first impedance element which are separated by a first unidirectional current device, said second path including a second load winding of said second transformer means inductively coupled to said second core member and a second impedance element which are separated by a second unidirectional current device, the first alternating current source being connected between the junction of said load windings and the junction of said impedance elements, said first and second unidirectional current devices being poled in predetermined directions whereby current from the first alternating current source flows through both the first and second parallel current paths during the same alternation of said first source, feedback signal means operatively connected to the first and second saturable transformer means and to the circuit means for obtaining a feedback signal functionally related to the sum of the currents in both the first and second paths, other circuit means including a second source of alternating current for resetting said first and second saturable magnetic core members, said other circuit means comprising a pair of additional parallel unidirectional current paths connected between the opposite terminals of the second alternating current source, current flowing in both paths of said pair of additional parallel unidirectional current paths during the same alternation of the second alternating current source, said pair of additional paths including windings respectively of said first and second saturable transformer means, first saturable reactor means included in one of said additional paths, second saturable reactor means included in the other of said additional paths, winding means for said first and second saturable reactor means having the signal to be amplified applied thereto, other winding means inductively coupled to said first and second saturable reactor means, and further circuit means connecting said other winding means to said feedback signal means whereby the signal functionally related to the sum of the currents in the first and second current paths is applied to the other winding means, the signal in the other winding means varying with variations in the quiescent current of the amplifier, said last-named signal while applied to said other winding means automatically adjusting the biasing magnetic fields on the first and second saturable reactor means to maintain the operating point and the gain of the amplifier substantially constant.

References Cited in the file of this patent

UNITED STATES PATENTS

| | | |
|---|---|---|
| 2,730,574 | Belsey | Jan. 10, 1956 |
| 2,752,429 | Hanson | June 26, 1956 |
| 2,770,737 | Ramey, Jr. | Nov. 13, 1956 |
| 2,794,173 | Ramey, Jr. | May 28, 1957 |
| 2,809,241 | Weissman | Oct. 8, 1957 |

OTHER REFERENCES

Electronic Engineering, May 1954, pages 180–185; Maine—"High Speed Magnetic Amplifiers."

Naval Research Labs. Report—4205, "Fast Response with Magnetic Amplifiers," Scorgie, publ. July 29, 1953.

Geyger: "Magnetic Amplifier Circuits" First edition publ. McGraw-Hill Book Co. Jan. 29, 1954, pages 157 and 158.